United States Patent
Song et al.

(10) Patent No.: US 10,024,955 B2
(45) Date of Patent: *Jul. 17, 2018

(54) SYSTEM AND METHOD FOR DETERMINING OF AND COMPENSATING FOR MISALIGNMENT OF A SENSOR

(71) Applicant: GM GLOBAL TECHNOLOGY OPERATIONS LLC, Detroit, MI (US)

(72) Inventors: Xiaofeng Frank Song, Novi, MI (US); Shuqing Zeng, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 598 days.

This patent is subject to a terminal disclaimer.

(21) Appl. No.: 14/229,178

(22) Filed: Mar. 28, 2014

(65) Prior Publication Data

US 2015/0276923 A1 Oct. 1, 2015

(51) Int. Cl.
| | |
|---|---|
| G01S 7/497 | (2006.01) |
| G01S 7/40 | (2006.01) |
| G01S 7/52 | (2006.01) |
| G01S 13/93 | (2006.01) |
| G01S 15/93 | (2006.01) |
| G01S 17/93 | (2006.01) |
| G01S 13/86 | (2006.01) |

(52) U.S. Cl.
CPC .......... *G01S 7/4972* (2013.01); *G01S 7/4004* (2013.01); *G01S 7/4026* (2013.01); *G01S 7/52004* (2013.01); *G01S 13/931* (2013.01); *G01S 15/931* (2013.01); *G01S 17/936* (2013.01); *G01S 13/86* (2013.01); *G01S 2007/403* (2013.01); *G01S 2013/9353* (2013.01); *G01S 2013/9364* (2013.01); *G01S 2013/9367* (2013.01)

(58) Field of Classification Search
CPC .... G01S 13/931; G01S 15/931; G01S 17/936; G01S 7/4004; G01S 7/4026; G01S 7/4972
USPC .......................................................... 702/97
See application file for complete search history.

(56) References Cited

U.S. PATENT DOCUMENTS

| | | | |
|---|---|---|---|
| 5,422,829 | A | 6/1995 | Pollock |
| 5,512,904 | A | 4/1996 | Bennett |
| 5,964,822 | A | 10/1999 | Alland et al. |
| 6,175,802 | B1 | 1/2001 | Okude et al. |

(Continued)

FOREIGN PATENT DOCUMENTS

CN 102778670 A 11/2012

OTHER PUBLICATIONS

STMicroelectronic, "Tilt measurement using a low-g 3-axis accelerometer", Apr. 2010.*

(Continued)

*Primary Examiner* — Michael Nghiem
*Assistant Examiner* — Peter Ngo
(74) *Attorney, Agent, or Firm* — Lorenz & Kopf, LLP

(57) ABSTRACT

Methods and systems for determining a misalignment angle for a sensor in a vehicle are provided. The method, for example, may include, but is not limited to determining, by a processor, when an object detected in sensor data acquired by the sensor is a stationary object, and calculating, by the processor, the misalignment angle of the sensor based upon sensor data associated with the stationary object.

11 Claims, 2 Drawing Sheets

(56) References Cited

U.S. PATENT DOCUMENTS

| | | | |
|---|---|---|---|
| 6,202,027 B1 * | 3/2001 | Alland | G01S 7/4004 |
| | | | 340/435 |
| 6,587,784 B1 | 7/2003 | Okude et al. | |
| 7,337,650 B1 | 3/2008 | Preston et al. | |
| 2004/0027272 A1 * | 2/2004 | Richardson | B60K 31/0008 |
| | | | 342/70 |
| 2005/0261573 A1 | 11/2005 | Satoh et al. | |
| 2006/0031014 A1 | 2/2006 | Sato et al. | |
| 2007/0297695 A1 | 12/2007 | Aratani et al. | |
| 2010/0017128 A1 | 1/2010 | Zeng | |
| 2010/0235129 A1 | 9/2010 | Sharma et al. | |
| 2010/0324862 A1 | 12/2010 | Sato et al. | |
| 2011/0007157 A1 | 1/2011 | Sekelsky et al. | |
| 2012/0134457 A1 | 5/2012 | Suina et al. | |
| 2012/0312960 A1 | 12/2012 | Mine | |
| 2013/0124142 A1 | 5/2013 | Zeck | |
| 2013/0218398 A1 * | 8/2013 | Gandhi | B60R 16/02 |
| | | | 701/31.1 |
| 2014/0163888 A1 | 6/2014 | Bowler et al. | |
| 2015/0323651 A1 | 11/2015 | Poiger et al. | |
| 2016/0161597 A1 | 6/2016 | Treptow et al. | |
| 2016/0209211 A1 | 7/2016 | Song et al. | |
| 2016/0223657 A1 | 8/2016 | Huntzicker et al. | |

OTHER PUBLICATIONS

USPTO, Final Office Action in U.S. Appl. No. 14/614,176 dated Oct. 20, 2016.

Huntzicker, Fred W., U.S. Appl. No. 14/614,176 entitled "Vehicle Sensor Compensation," filed Feb. 4, 2015.

Song, Xiaofeng F., U.S. Appl. No. 14/598,894 entitled "Method for Determining Misalignment of an Object Sensor," filed Jan. 16, 2015.

USPTO, Office Action for U.S. Appl. No. 14/614,176, dated Jun. 22, 2016.

USPTO, Office Action for U.S. Appl. No. 14/614,176 dated Jun. 19, 2017.

USPTO, Office Action for U.S. Appl. No. 14/614,176 dated Jun. 22, 2017.

State Intellectual Property Office of the People's Republic of China, Office Action in Chinese Patent Application No. 201610078716.2 dated Aug. 25, 2017.

* cited by examiner

SYSTEM AND METHOD FOR DETERMINING OF AND COMPENSATING FOR MISALIGNMENT OF A SENSOR

TECHNICAL FIELD

The technical field generally relates to sensors, and more particularly to the detecting of and compensating for misaligned sensors in vehicles.

BACKGROUND

Modern vehicles are being fitted with a multitude of different sensors. The sensors are being used for autonomous driving vehicle systems, autonomous parking systems, adaptive cruise control systems, crash avoidance systems and for a variety of other uses. Data from some of the sensors may have a predetermined frame of reference. For example, if a sensor mounted on the front center of the vehicle may be pointed in a direction parallel with the vehicle, the data from the sensor may be processed based upon the presumption that the sensor is pointed in the direction parallel with the vehicle. Accordingly, if the sensor becomes misaligned, the data from the sensor may not be accurate.

Accordingly, it is desirable to provide systems and methods for determining if a sensor is misaligned and for compensating for the misalignment. Furthermore, other desirable features and characteristics of the present invention will become apparent from the subsequent detailed description and the appended claims, taken in conjunction with the accompanying drawings and the foregoing technical field and background.

SUMMARY

In accordance with an embodiment, a vehicle is provided. The vehicle may include, but is not limited to, a sensor configured to acquire sensor data, a processor communicatively coupled to the processor, wherein the processor is configured to determine when an object detected in the acquired sensor data is a stationary object, and calculate a misalignment angle of the sensor based upon sensor data associated with the stationary object.

In accordance with another embodiment, a method for determining a misalignment angle for a sensor in a vehicle is provided. The method may include, but is not limited to, determining, by a processor, when an object detected in sensor data acquired by the sensor is a stationary object, and calculating, by the processor, the misalignment angle of the sensor based upon sensor data associated with the stationary object.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As discussed above, vehicles are more frequently being fitted with sensors used in autonomous driving vehicle systems, autonomous parking systems, adaptive cruise control systems, crash avoidance systems and for a variety of other safety systems. If the sensors become misaligned from a presumed frame of reference, due to either manufacturing or installation tolerances or due to subsequent wear and tear on the vehicle or an impact to the vehicle, the data from the sensor may be inaccurate. As discussed in further detail below a system and method for detecting a misalignment and compensating for a misalignment are provided herein. The system and method primarily utilizes data from the misaligned sensor itself to determine if the sensor is misaligned.

Figure 1:
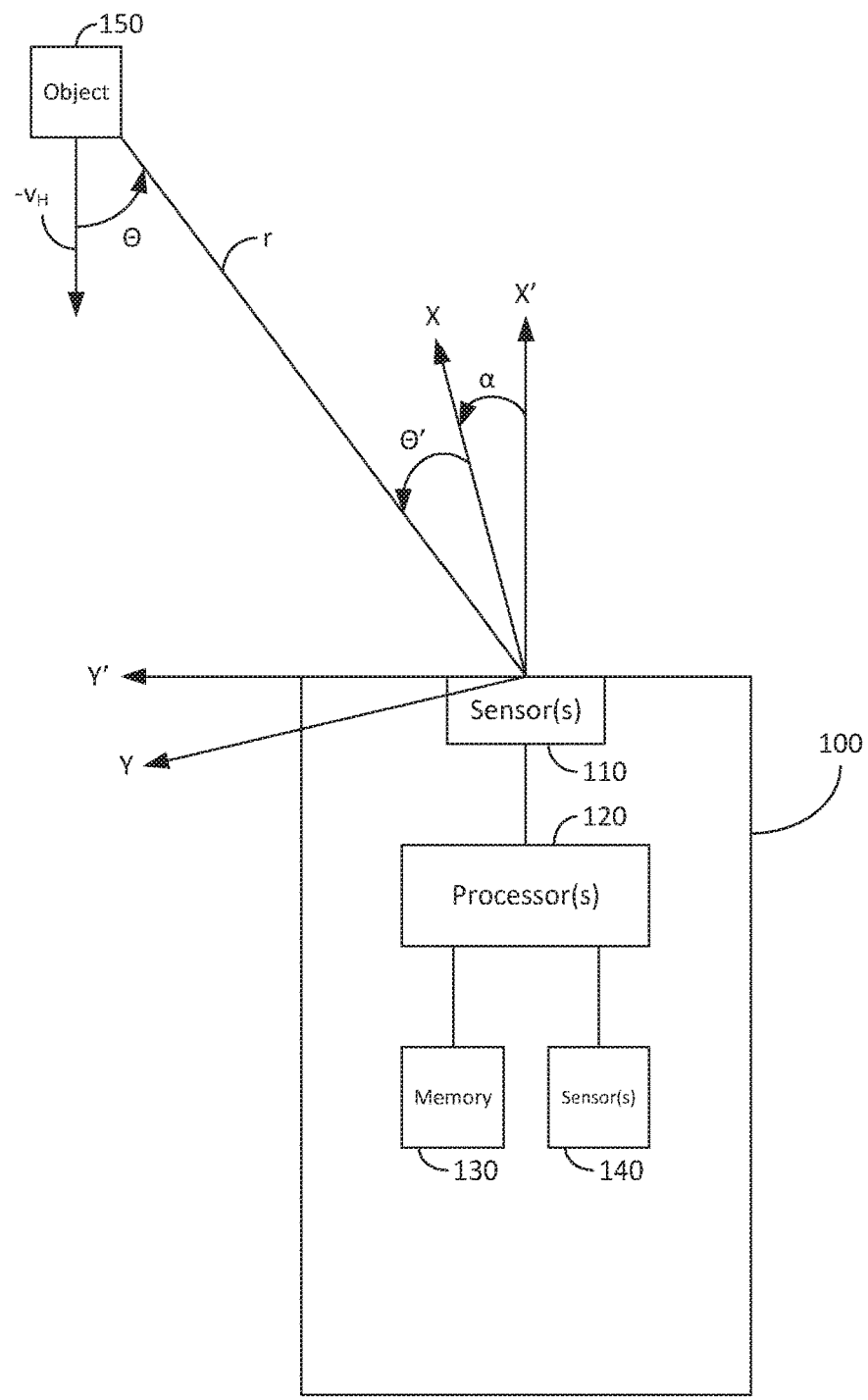
FIG. 1 is a block diagram of an exemplary vehicle, in accordance with an embodiment.

FIG. 1 is a block diagram of an exemplary vehicle 100, in accordance with an embodiment. The vehicle may be, for example, an automobile, a motorcycle, a motorized bicycle, an aircraft, a spacecraft, a watercraft, or any combination thereof. The vehicle 100 includes at least one sensor 110. The sensor 110 may be a radar sensor, a lidar sensor, a camera (optical, infrared, etc.) or the like. The sensor 110 is illustrated in FIG. 1 as being in the front-center of the vehicle 100. However, the sensor 110 may be located at any point in the vehicle 100. A front mounted sensor would have a nominal aligned angle of zero degree. In contrast, a left side mounted sensor may have a +90 degree nominal angle, a right side mounted sensor may have a −90 degree nominal angle and rear mounted sensor may have a 180 degree nominal angle.

The sensor 110 is communicatively coupled to at least one processor 120. The processor 120 may be a central processing unit (CPU), a graphics processing unit (GPU), a physic processing unit (PPU), an application specific integrated circuit (ASIC), or any other logic circuit or combination thereof. The processor 120, based upon data received from the sensor 110, may detect other vehicles, pedestrians, traffic lights, traffic signs, lane lines and a multitude of other objects for use in autonomous navigation or accident avoidance. The vehicle may further include a memory 130. The memory 130 may be a non-volatile type memory, a volatile type memory, or a combination thereof. The memory 130 may store non-transitory computer-readable instruction, which when executed by the processor, may cause the processor to implement the system and method for determining the misalignment angle of the sensor discussed herein.

As discussed above, the sensor 110 may become misaligned due to various factors. In order to correct for the misalignment, the processor 120 utilizes the data collected from the sensor 110 to determine a misalignment angle. The processor 120 may be communicatively coupled to one or more other sensors 140 to aid in calculating the misalignment angle. The sensors 140 may include, but are not limited to, one or more of a speed sensor for determining a speed of the vehicle 100, a gyroscope to determine a yaw of the vehicle 100 and a steering wheel angle and/or road wheel angle sensor to indicate if vehicle is turning in linear situation.

As seen in FIG. 1, a direction the vehicle is traveling is represented by the vector X' and a vector perpendicular to the direction the vehicle is traveling is represented by the vector Y'. When the sensor 110 is misaligned, the sensor may be pointed at a vector X where a vector perpendicular to the direction of the sensor is represented by the vector Y. The misalignment angle is the angle α between the vectors X' and X.

As discussed in further detail below, the processor 120 determines the misalignment angle α by comparing reported positions of a stationary object 150 with expected positions. The stationary object 150 may be, for example, a street light, a street sign, a bridge, a tree, lane lines, a parked vehicle, or any other detectable stationary object. The processor 120 classifies a detected object as a stationary object 150, rather than a dynamic object such as another vehicle or a pedestrian, by comparing detected object info (one or more of a range, a range rate, an azimuth angle, an azimuth angle rate, etc.) to the host vehicle's motion. If the relative motion of the object is close to the host vehicle's motion, the object is deemed as "stationary." In other words, if an object is stationary, the data from the sensors will indicate that the object, while not itself in motion, is approaching the vehicle at the approximate speed of the vehicle due to the motion of the vehicle itself.

In FIG. 1, a stationary object 150 is a relative distance r from the vehicle 100. The angle between the direction the vehicle is traveling X' and the stationary object 150 is represented by the angle Θ. The angle between vector X, representing the direction the sensor is pointing, and the stationary object 150 is represented by the angle Θ'. A speed of the stationary object relative to the vehicle is $-v_H$ (i.e., the negative of the speed of the vehicle).

The process for determining the misalignment angle α may be performed periodically by the sensor 110, and/or may be performed after a detected event, such as after the vehicle 100 experiences an impact. As discussed in further detail below, the process for determining the misalignment angle α may vary depending upon the type of sensor.

Figure 2:
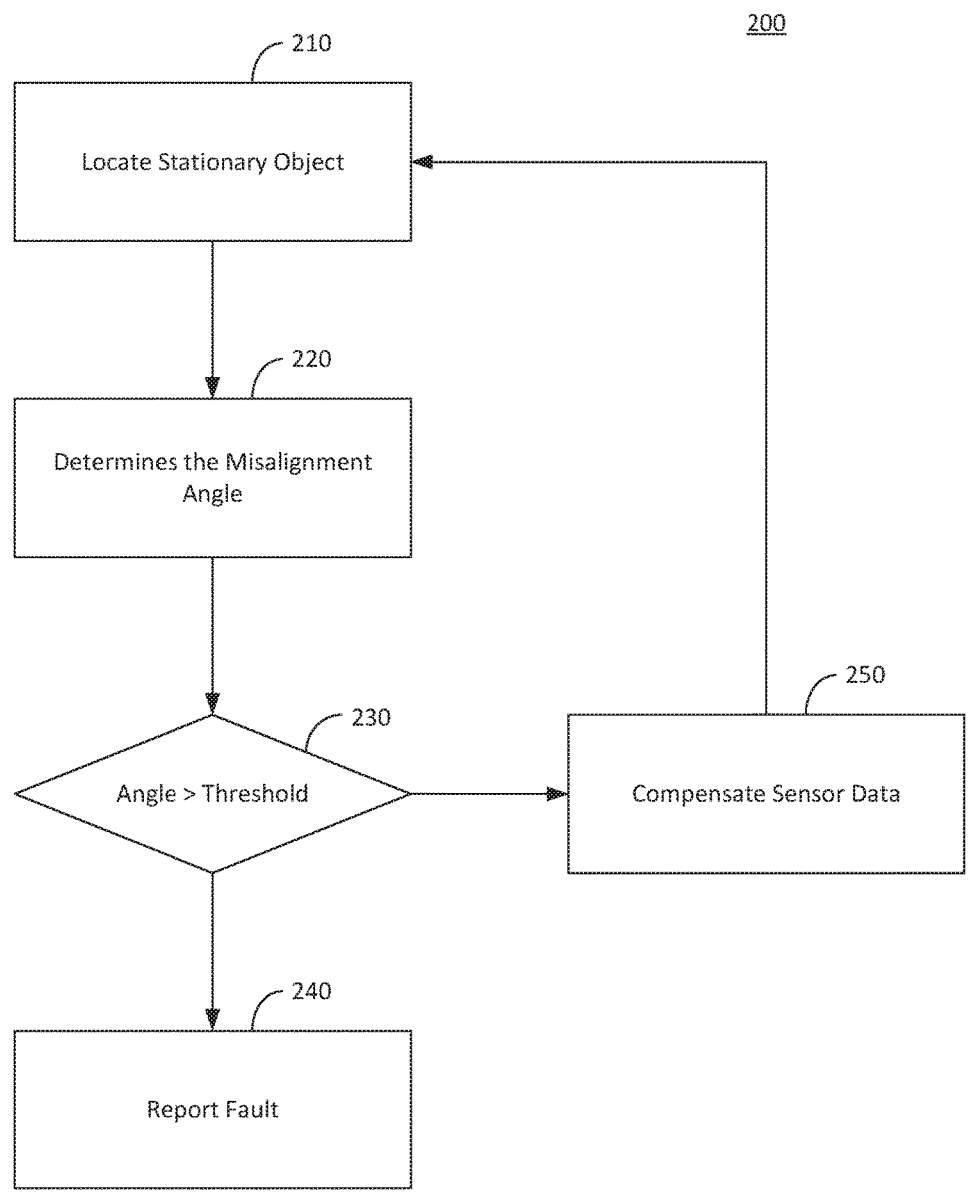
FIG. 2 is a flow diagram illustrating a method for determining a misalignment angle, in accordance with an embodiment.

FIG. 2 is a flow diagram illustrating a method 200 for determining a misalignment angle α. A processor, such as the processor 120 illustrated in FIG. 1, first locates a stationary object via the sensor 110. (Step 210). As discussed above, the processor may classify a detected object as a stationary object 150, rather than a dynamic object such as another vehicle or a pedestrian, by comparing detected object info (one or more of a range, a range rate, an azimuth angle, an azimuth angle rate, etc.) to the host vehicle's motion. If the relative motion of the object is close to the host vehicle's motion, the object is deemed as "stationary."

The processor then determines the misalignment angle α based upon data from the sensor 110 and a reported vehicle speed. (Step 220). For a radar type sensor, or other sensors which utilize a Doppler measurement, such as coherent lidar sensors and ultrasonic sonars, the sensor data includes the reported distance r' between the stationary object 150 and the vehicle 100 as well as the angle between the stationary object and the vehicle. When the sensor is misaligned, the reported angle in the sensor data is the angle Θ' representing the angle between the vector X and the stationary object 150. As discussed above, the actual angle between the vehicle 100 and the stationary object is the angle Θ illustrated in FIG. 1. The angle Θ is equal to the sum of Θ' and the misalignment angle α (i.e., Θ=Θ'+α).

The reported range rate $\dot{r}$ between the sensor 110 and the stationary object 150 should be substantially dependent on the actual relative velocity along the X-axis between the stationary object 150 and the vehicle 100 unless there is severe damage to the vehicle 100 in the area of the sensor 110. The actual range rate $\dot{r}$ between the stationary object 150 and the vehicle 100 is based upon the relative speed of the vehicle 100 with respect to the stationary object 150 and the actual angle Θ between the stationary object 150 and the vehicle 100. In one embodiment, for example, the measured range rate $\dot{r}$ from the sensor is related to actual angle Θ by Equation 1:

$$\dot{r} = -V\cos(\Theta) \qquad \text{Equation 1}$$

where V is the relative speed of the stationary object 150 with respect to the vehicle 100. By plugging in the equation for Θ (i.e., Θ=Θ'+α) and solving the equation for α, the processor may determine the misalignment angle α for a radar type sensor, or other sensors which utilize a Doppler measurement according to Equation 2:

$$\alpha = \arccos\left(-\left(\frac{\dot{r}}{V}\right)\right) - \Theta' \qquad \text{Equation 2}$$

For lidar based sensors or camera based sensors which do not directly measure Doppler, velocities (Doppler equivalent signals) can be estimated through position difference of adjacent time loops through tracking methods. Accordingly the data received from these types of sensor may be analyzed by the processor to estimate a position (x, y) of the stationary object and a speed ($v_x$, $v_y$) of the stationary object 150 in both the coordinate relative to the vehicle 100.

There are multiple ways to derives velocities from position tracking. In one embodiment, for example, $l_0=(x_0, y_0)$ is a target's position at time t=0, and $l_1=(x_1, y_1)$ is the position at next time loop t=1. The velocity $v=(v_x, v_y)$ may be determined according to $$v = \frac{l_1 - l_0}{\Delta t}$$

where Δt is the sampling interval. Then the derived velocity v is fed to a low pass filter to remove potential high frequency noise.

In another embodiment, for example, an alternative method to estimate v is applying Kalman filtering technique with following state equation: $s_1=Fs_0+u$ where $s_1$ is the predicted state variable at time t=1, including signals $s_1=(x_1, y_1, v_{x1}, v_{y1})$; $s_0$ is the state variables at previous time step; F is linear transform matrix:

$$F = \begin{pmatrix} 1 & 0 & \Delta t & 0 \\ 0 & 1 & 0 & \Delta t \\ 0 & 0 & 1 & 0 \\ 0 & 0 & 0 & 1 \end{pmatrix}$$

and u is a zero-mean Gaussian noise vector with covariance matrix Q. At each time step, the position part of state variables is observed by the sensor: p=Hs+w where H is measurement matrix and w is a zero-mean Gaussian distribution with covariance matrix R. Then the Kalman filtering equations can be applied to estimate the state variables at each time step, which includes velocities of each object (i.e., $v_x$ and $v_y$).

The processor may then calculate the misalignment angle α based upon the estimated position, relative velocity and a yaw rate $\omega_H$ of the vehicle 100. (Step 220). The yaw rate $\omega_H$ of the vehicle 100 may be determined, for example, based upon data from one of the other sensors 140 in the vehicle 100.

A predicted velocity $v_p$ of the stationary object 150 is estimated by the processor according to equation 3:

$$v_p = \begin{bmatrix} -v_H + \omega_H y \\ -\omega_H x \end{bmatrix} \qquad \text{Equation 3}$$

In other words, the predicted object velocity $v_p$ of the stationary object 150 relative to the vehicle 100 is based upon the speed $v_H$ of the vehicle 100 and the yaw rate $\omega_H$ of the vehicle 100, and the position of the object x, y in XY coordinate system illustrated in FIG. 1. $\omega_H x$ and $-\omega_H y$ are the velocity components induced by the rotation of the vehicle 100. When the sensor 110 is misaligned, the predicted target velocity $v_p$ will be off proportional to the misalignment angle. In other words, if the predicted target velocity p is multiplied by a rotation matrix $R_\alpha$, which is directly related to the misalignment angle $\alpha$ (i.e., $$R_\alpha = \begin{pmatrix} \cos\alpha & \sin\alpha \\ -\sin\alpha & \cos\alpha \end{pmatrix}),$$

the result should be equal to the velocity of the stationary object $$v = \begin{pmatrix} v_x \\ v_y \end{pmatrix}$$

relative to the vehicle 100 returned by the sensor 110. In one embodiment, for example, the relationship may be determined according to Equation 4:

$$R_\alpha \begin{bmatrix} -v_H + \omega_H x \\ -\omega_H y \end{bmatrix} = \begin{bmatrix} v_x \\ v_y \end{bmatrix} \qquad \text{Equation 4}$$

Assume N pairs of velocity of the object returned by the sensor and predicted object velocity are buffered in the system, by some screening logic to ensure only stationary objects are selected. The buffered N samples of the predicted object velocities are written as a 2-by-N matrix $P=(v_{p1} \; v_{p2} \; \ldots \; v_{pN})$ where the i-th sample has velocity components $-v_H+\omega_H x$ and $-\omega_H y$ along X- and Y-axes, respectively. The buffered N samples of velocities of object returned by the sensor are written as a 2-by-N matrix: $M=(v_1 \; v_2 \; \ldots \; v_N)$ where the i-th sample has velocity components $v_x$ and $v_y$ along X- and Y-axes, respectively.

The processor determines the rotation matrix $R_\alpha$ according to equation 5:

$$R_\alpha = UCV^T \qquad \text{Equation 5}$$

where U is a matrix whose columns represent the left singular vectors of matrix product $PM^T$, V is a matrix whose columns represent the right singular vectors $PM^T$, C is a diagonal matrix can be computed according to Equation 6:

$$C = \begin{bmatrix} 1 & 0 \\ 0 & \det(UV^T) \end{bmatrix} \qquad \text{Equation 6}$$

where T is matrix transpose operator and det(X) computes the determinant of the matrix X.

In one embodiment, for example, the processor may first calculated U and V using singular value decomposition (SVD) such that $$USV^T = PM^T$$

where S is the diagonal matrix with singular values.

In one embodiment, since the matrix product $A=PM^T$ is a 2-by-2 matrix, there is a close form solution for SVD and finding the matrices U and V:

$$S = AA^T$$

$\varphi = \frac{1}{2} a \tan 2(S_{21}+S_{12}, S_{11}-S_{22})$, a tan 2 ( ) denotes the arctangent function with two arguments. $S_{ij}$ is the (i,j)-element of the matrix S.

$$U = \begin{bmatrix} \cos(\varphi) & -\sin(\varphi) \\ \sin(\varphi) & \cos(\varphi) \end{bmatrix}$$

$$S' = A^T A$$

$\theta = \frac{1}{2} a \tan 2 (S'_{21}+S'_{12}, S'_{11}-S'_{22})$ where $S'_{ij}$ is the (i,j)-element of the matrix S'.

$$W = \begin{bmatrix} \cos(\theta) & -\sin(\theta) \\ \sin(\theta) & \cos(\theta) \end{bmatrix}$$

$$\alpha = S_{11} + S_{22}$$

$$\beta = \sqrt{(S_{11}-S_{22})^2 + 4S_{21}S_{12}}$$

$$\Sigma = \begin{bmatrix} \sqrt{(\alpha+\beta)/2} & 0 \\ 0 & \sqrt{(\alpha-\beta)/2} \end{bmatrix}$$

$$B = U^T A W$$

$$C = \begin{bmatrix} \text{sign}(B_{11}) & 0 \\ 0 & \text{sign}(B_{22}) \end{bmatrix},$$

sign( ) denotes the sign function $$V = WC$$

After $R_\alpha$ is computed by Equation 5, let c be the (1,1)-element of the matrix and s be the (1,2)-element of the matrix, the misalignment angle is computed as $$\alpha = \tan^{-1}\left(\frac{s}{c}\right)$$

In one embodiment, a circular queue with fixed maximum buffer size is used for store pairs of velocity of the object returned by the sensor and predicted object velocity. New samples are added to the queue while some old samples are removed from the queue. Matrix product $PM^T$ can be incrementally computed as $$A_1 = A_0 + p_n m_n^T - p_o m_o^T \qquad 5$$

where $A_0$ is the matrix product $PM^T$ in previous time step, $A_1$ is the new matrix product, $p_n$ and $m_n$ are the new sample pair added to the buffer, and $p_o$ and $m_o$ are the old sample pair to be removed from the buffer.

In one embodiment, for example, the processor may take an average of multiple determined misalignment angles α to determine an average misalignment angle. The processor may determine multiple misalignment angles α for s single stationary object by calculating the misalignment angle α a number of times as the vehicle passes the single stationary object. Alternatively, or in addition thereto, the processor may average the misalignment angle α for multiple different stationary objects over time.

The processor then determines if the determined misalignment angle α, or the average misalignment angle, is greater than a predetermined threshold. (Step 230). If the processor determined misalignment angle α, or the average misalignment angle, is greater than the predetermined threshold, the processor reports a fault. (Step 240). The predetermined threshold may be indicative of damage to the sensor 110 or to the vehicle 100 in the area of the sensor. Accordingly, the processor may send a visual or audio signal to the driver of the vehicle, or a communication to a service center, to indicate that the vehicle requires service.

If the processor determined misalignment angle α, or the average misalignment angle, is less than the predetermined threshold, the processor compensates incoming sensor data based upon the misalignment angle α. (Step 250). In one embodiment, for example, the processor may adjust the object data reported by that sensor by rotating object data by the estimated misalignment angle. The process then returns to Step 210 to calculate the next value for the misalignment angle α.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
    a first sensor configured to acquire sensor data; and
    a speed sensor configured to output speed data corresponding to the vehicle, and
    a processor communicatively coupled to the first sensor and the speed sensor, wherein the processor is configured to:
        determine when an object detected in the acquired sensor data is a stationary object based upon object information detected by the first sensor and the speed data;
        calculate a misalignment angle α of the first sensor according to:

$$\alpha = \arccos\left(-\left(\frac{r}{v}\right)\right) - \Theta',$$

where r is a range rate between the stationary object and the vehicle acquired by the first sensor, Θ' is an angle between the stationary object and the vehicle acquired by the first sensor, and v is based upon the speed data corresponding to the vehicle;
        determine when the misalignment angle is greater than a predetermined threshold;
        determine a compensated position of each object detected by the first sensor relative to the vehicle by rotating the position of each detected object by an angle equal to the calculated misalignment angle when the misalignment angle is determined to be less than the predetermined threshold to improve the accuracy of the first sensor; and
        control movement of the vehicle based upon the compensated position of each object detected by the first sensor.

2. The vehicle of claim 1, wherein the processor is further configured to:
    calculate misalignment angles for at least one stationary object at least two different times; and
    determine an average misalignment angle of the first sensor based upon the calculated misalignment angles.

3. The vehicle of claim 1, wherein the processor is further configured to indicate a fault when the misalignment angle is determined to be greater than the predetermined threshold.

4. The vehicle of claim 1, wherein the vehicle further comprises:
    a yaw sensor communicatively coupled to the processor and configured to output yaw data corresponding to the vehicle, and
    the processor is further configured to calculate the misalignment angle of the first sensor based upon sensor data associated with the stationary object and the yaw data corresponding to the vehicle.

5. A method for determining a misalignment angle for a first sensor in a vehicle, comprising:
    determining, by a processor, a speed of the vehicle based upon data received from a speed sensor;
    determining, by a processor, when an object detected in sensor data acquired by the first sensor is a stationary object based upon object information detected by the first sensor and the speed data;
    calculating, by the processor, the misalignment angle α of the first sensor according to:

$$\alpha = \arccos\left(-\left(\frac{r}{v}\right)\right) - \Theta',$$

where r is a range rate between the stationary object and the vehicle acquired by the first sensor, Θ' is an angle between the stationary object and the vehicle acquired by the first sensor, and v is based upon the speed data corresponding to the vehicle;
    determining, by the processor, when the misalignment angle is greater than a predetermined threshold;
    determining, by the processor, a compensated position of each object detected by the first sensor relative to the vehicle by rotating the position of each detected object by an angle equal to the calculated misalignment angle when the misalignment angle is determined to be less than the predetermined threshold to improve the accuracy of the first sensor; and controlling, by the processor, movement of the vehicle based upon the compensated position of each object detected by the first sensor.

6. The method of claim 5, further comprising:

calculating, by the processor, misalignment angles for at least one stationary object at least two different times; and determining, by the processor, an average misalignment angle of the first sensor based upon the calculated misalignment angles.

7. The method of claim 5, further comprising:

indicating, by the processor, a fault when the misalignment angle is determined to be greater than the predetermined threshold.

8. The method of claim 5, wherein the vehicle further comprises a yaw sensor communicatively coupled to the processor and configured to output yaw data corresponding to the vehicle, and the method further comprises calculating, by the processor, the misalignment angle of the first sensor based upon sensor data associated with the stationary object and the yaw data corresponding to the vehicle.

9. A non-transitory computer readable medium comprising instructions, which when executed by a processor in a vehicle comprising a first sensor, cause the processor to:

determine a speed of the vehicle based upon data received from a speed sensor;

determine when an object detected in sensor data acquired by the first sensor is a stationary object based upon object information detected by the first sensor and the speed data; and calculate the misalignment angle α of the first sensor according to:

$$\alpha = \arccos\left(-\left(\frac{r}{v}\right)\right) - \Theta',$$

where r is a range rate between the stationary object and the vehicle acquired by the first sensor, $\Theta'$ is an angle between the stationary object and the vehicle acquired by the first sensor, and v is based upon the speed data corresponding to the vehicle;

determine when the misalignment angle is greater than a predetermined threshold;

determine a compensated position of each object detected by the first sensor relative to the vehicle by rotating the position of each detected object by an angle equal to the calculated misalignment angle when the misalignment angle is determined to be less than the predetermined threshold to improve the accuracy of the first sensor; and control movement of the vehicle based upon the compensated position of each object detected by the first sensor.

10. The non-transitory computer-readable medium of claim 9, wherein the instructions which when executed by the processor in the vehicle, further cause the processor to:

calculate misalignment angles for at least one stationary object at least two different times; and determine an average misalignment angle of the first sensor based upon the calculated misalignment angles.

11. The non-transitory computer-readable medium of claim 9, wherein the instructions which when executed by the processor in the vehicle, further cause the processor to:

indicate a fault when the misalignment angle is determined to be greater than the predetermined threshold.

* * * * *